(12) United States Patent
Yoon

(10) Patent No.: US 7,451,468 B2
(45) Date of Patent: Nov. 11, 2008

(54) DIGITAL BROADCAST RECEIVING TERMINAL FOR PROVIDING PROGRAM INFORMATION FOR A SPECIFIC TIME PERIOD AND METHOD THEREOF

(75) Inventor: Sang-Hyeon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 707 days.

(21) Appl. No.: 11/153,288

(22) Filed: Jun. 15, 2005

(65) Prior Publication Data
US 2006/0041907 A1   Feb. 23, 2006

(30) Foreign Application Priority Data
Aug. 19, 2004   (KR) .................. 10-2004-0065366

(51) Int. Cl.
G06F 3/00   (2006.01)
G06F 13/00   (2006.01)
H04N 5/445   (2006.01)

(52) U.S. Cl. .................. 725/39; 725/44; 725/52; 725/53

(58) Field of Classification Search .................. 725/39, 725/44, 45, 52, 53, 56, 57
See application file for complete search history.

(56) References Cited

U.S. PATENT DOCUMENTS

| 7,203,952 B2 * | 4/2007 | Broadus | 725/40 |
|---|---|---|---|
| 2002/0188947 A1 * | 12/2002 | Wang et al. | 725/45 |
| 2003/0088869 A1 * | 5/2003 | Swix et al. | 725/44 |
| 2003/0163814 A1 | 8/2003 | Hayakawa | |

FOREIGN PATENT DOCUMENTS

| JP | 07-107086 | 4/1995 |
|---|---|---|
| JP | 08-125996 | 5/1996 |
| JP | 99/44112 | 9/1999 |
| JP | 2000-507408 | 6/2000 |
| JP | 2000-270277 | 9/2000 |
| JP | 2000-324418 | 11/2000 |
| JP | 2001-238145 | 8/2001 |
| JP | 2002-041378 | 2/2002 |
| JP | 2002-505457 | 2/2002 |
| JP | 2003-169267 | 6/2003 |
| JP | 2004-172839 | 6/2004 |
| WO | WO9718670 | 5/1997 |
| WO | 97/34414 | 9/1997 |

* cited by examiner

Primary Examiner—Ngoc K Vu
(74) Attorney, Agent, or Firm—The Farrell Law Firm, PC

(57) ABSTRACT

A digital broadcast receiving terminal for providing broadcast programming information for a specific time period and a method thereof are disclosed. The digital broadcast receiving terminal includes an input unit, a reception unit for receiving digital broadcasting data and program guide data, an output unit for output of the digital broadcasting data or the program guide data, a management unit for storing/managing the received program guide data, and a control unit, in response to a request for broadcasting program information by channels in the same time period, for detecting the program guide data by channels in the corresponding time period from the management unit and creating the broadcasting program information by channels in the corresponding time period from the program guide data by channels to output the created broadcasting program information through the output unit.

26 Claims, 8 Drawing Sheets

| CHANNEL | TIME | CHANNEL NAME | CHANNEL EXPLANATION | VIEWING GRADE |
|---|---|---|---|---|
| CH 1 | 09:00 ~ 10:00 | FIRST PROGRAM | FIRST PROGRAM EXPLANATION | 18 |
| | 10:00 ~ 11:00 | SECOND PROGRAM | SECOND PROGRAM EXPLANATION | 15 |
| | ... | ... | ... | |
| CH 2 | 08:30 ~ 11:00 | THIRD PROGRAM | THIRD PROGRAM EXPLANATION | 07 |
| | 11:00 ~ 12:30 | FOURTH PROGRAM | FOURTH PROGRAM EXPLANATION | ALL |
| | ... | ... | ... | ... |
| | ... | ... | ... | ... |

FIG.2
(PRIOR ART)

```
          CH 1 ... MBC

14:30 ~ 16:00

ACTOR: LEE YOUNG-AE, JEE JIN-HEE
DIRECTOR: HONG GIL-DONG
VIEWING GRADE: 15
(PROGRAM EXPLANATION)
```

FIG.6C

DIGITAL BROADCAST RECEIVING TERMINAL FOR PROVIDING PROGRAM INFORMATION FOR A SPECIFIC TIME PERIOD AND METHOD THEREOF

PRIORITY

This application claims priority to an application entitled "Digital Broadcast Receiving Terminal for Guiding Broadcasting Program Information in Same Time Zone and Method Thereof" filed in the Korean Industrial Property Office on Aug. 19, 2004 and assigned Serial No.2004-65366, the contents of which are hereby incorporated by reference.

BACKGROUND OF THE INVENTION

1. Field of the Invention

The present invention relates generally to a terminal for receiving digital broadcasts, and more particularly to a digital broadcast receiving terminal for providing broadcast program information for a specific time period and a method thereof.

2. Description of the Related Art

Typically, digital broadcasting includes digital broadcasts of high fidelity picture and sound in place of conventional analog broadcasting techniques. Recently, with the development of digital broadcasting technology and mobile communication technology, research and development focuses on providing digital broadcasts while the user is moving. In particular, digital multimedia broadcasting (DMB) service has been developed using a mobile communication terminal to provide multimedia broadcasts through a personal portable receiver having a non-directional antenna mounted thereon, or through a receiver mounted in vehicle, even while the user is moving.

FIG. 1 is a view illustrating the construction of a prior art system for implementing the DMB service.

The system for implementing the DMB service includes a data sending center 10, a satellite 20 and receiving devices such as a mobile communication terminal 30, a receiver for vehicles 40, a receiver for home use 50, etc.

The data transmission unit 10 compresses and modulates DMB data (for example, image, sound and data signals) and sends the modulated DMB data signal to the satellite 20. The satellite 20 receives, amplifies and then frequency-converts the signal for transmission to the ground. The receiving devices 30, 40 and 50 receive, demodulate and decompress the signal to restore the received signal to its original state.

One advantage of the digital broadcasting service as described above is that it has fairly good channel efficiency in comparison to the analog broadcasting service. That is, with analog broadcasting, only one program can be transferred through one physical channel. However, with digital broadcasting, several programs can simultaneously be transferred through one physical channel. Accordingly, the digital broadcasting service can provide fairly many programs, and so usually provides program information so that the viewers can easily find and select their desired programs. For this, an EPG (Electronic Program Guide) service is used.

The EPG service is a service that broadcasting stations (or SOs (Service Operators) of the cable broadcasters) provide with various kinds of program information about the broadcasts so that viewers can easily locate and select desired programming. For example, the EPG service provides information (hereinafter referred to as 'EPG data') such as title, telecast start time, telecast end time, etc., of a respective program.

FIG. 2 is a view illustrating an example of conventional EPG data stored in a digital broadcast receiving terminal.

The EPG data includes program information (for example, program name, program explanation, viewing grade, etc.) by channels and by time periods.

Referring to FIG. 2, if it is assumed that a user selects a channel 1 ("CH 1"), the digital broadcast receiving terminal extracts program names (for example, "FIRST PROGRAM", "SECOND PROGRAM", . . . ), program explanations (for example, "FIRST PROGRAM EXPLANATION", "SECOND PROGRAM EXPLANATION", . . . ), viewing grades (for example, "18", "15", . . . ), etc., of programs telecast by time periods (for example, "09:00~10:00", "10:00~11:00", . . . ) from the EPG data to provide the "CH 1" broadcasting program information to the viewer.

Typically, the EPG data is provided for a predetermined period or when the EPG data is changed. Accordingly, the receiving devices 30, 40 and 50 illustrated in FIG. 1 may receive and store the EPG data, create and provide the digital broadcasting program information to the user in response to the user's request, or may receive the EPG data in response to the user's request and then create and provide the digital broadcasting program information to the user.

FIGS. 3A to 3D are exemplary views explaining broadcasting program information provided according to the prior art. That is, FIGS. 3A to 3D illustrate examples of views displayed to guide the broadcasting program information to the user.

FIG. 3A shows an example of an initial view for channel guide, and FIG. 3B shows an example of a view displayed when the user selects "Video Channel" from the view of FIG. 3A. FIG. 3C shows an example of a view displayed when the user selects "ch06" from the view of FIG. 3B, and FIG. 3D shows an example of a view of a program explanation (for example, actors, director, viewing grade, etc.) of the "Old Boy" displayed when the user selects "Old Boy" from the view of FIG. 3C.

The guide views as shown in FIGS. 3A to 3D are displayed over the whole display unit of the digital broadcast receiving terminal or on a part of the display unit together with the actual broadcasting data. In the former case, the user must discontinue viewing the broadcast currently displayed to confirm the digital broadcasting program information. In the latter case, the displayed views for the broadcasting data and the digital broadcasting program are small, inconvenient to view the broadcast or to confirm the digital broadcasting program information.

in addition, the prior art typically displays the broadcasting contents (i.e., programs) of each channel by time periods as illustrated in FIG. 3C. This also causes an inconvenience in confirming the information about programs telecast through several channels in the same time period. That is, in the prior art, there is no way to determine the programs broadcast at a specific time without going through the entire EPG.

SUMMARY OF THE INVENTION

Accordingly, the present invention has been designed to solve the above and other problems occurring in the prior art, and an object of the present invention is to provide a digital broadcast receiving terminal capable of easily confirming information about programs telecast through several channels in the same time period and a method thereof.

Another object of the present invention is to provide a digital broadcast receiving terminal capable of easily confirming information about programs telecast through several channels in the same time period without disturbing a user's viewing of a broadcast and a method thereof.

Still another object of the present invention is to provide a digital broadcast receiving terminal that enables a user to easily use digital broadcasting program information and a method thereof.

In order to accomplish the above and other objects, there is provided a digital broadcast receiving terminal including an input unit for receiving an input of an external control command, a reception unit for receiving digital broadcasting data and program guide data, an output unit for output of the digital broadcasting data or the program guide data, a management unit for storing/managing the received program guide data, and a control unit, in response to a request for broadcasting program information by channels in the same time period, for detecting the program guide data by channels in the corresponding time period from the management unit and creating the broadcasting program information by channels in the corresponding time period from the program guide data by channels to output the created broadcasting program information through the output unit.

In another aspect of the present invention, there is provided a method for guiding broadcasting program information in a specific time period, including detecting program guide data by channels in a specified time period from pre-stored program guide data in response to a request for broadcasting program information by channels in the corresponding time period, creating the broadcasting program information by channels in the corresponding time period from the program guide data by channels, and outputting the created broadcasting program information by channels.

BRIEF DESCRIPTION OF THE DRAWINGS

The above and other objects, features and advantages of the present invention will be more apparent from the following detailed description taken in conjunction with the accompanying drawings, in which:

FIG. 2 is a view illustrating an example of EPG data stored in a prior art digital broadcast receiving terminal;

FIGS. 6A to 6C are exemplary views explaining the guidance of broadcast programming information in the same time period as a user according to an embodiment of the present invention.

DETAILED DESCRIPTION OF THE PREFERRED EMBODIMENTS

Figure 1:
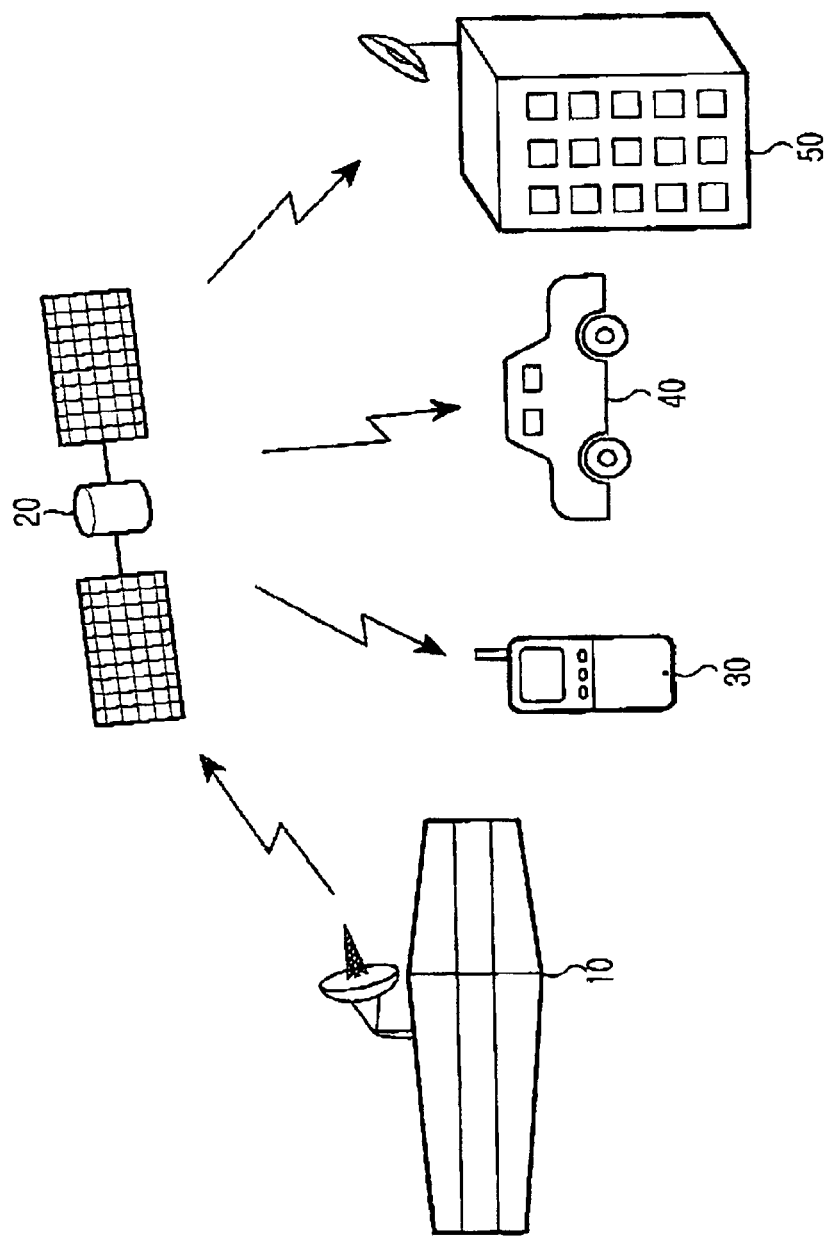
FIG. 1 is a view illustrating the construction of a prior art system for implementing the DMB service.
Figure 3A:
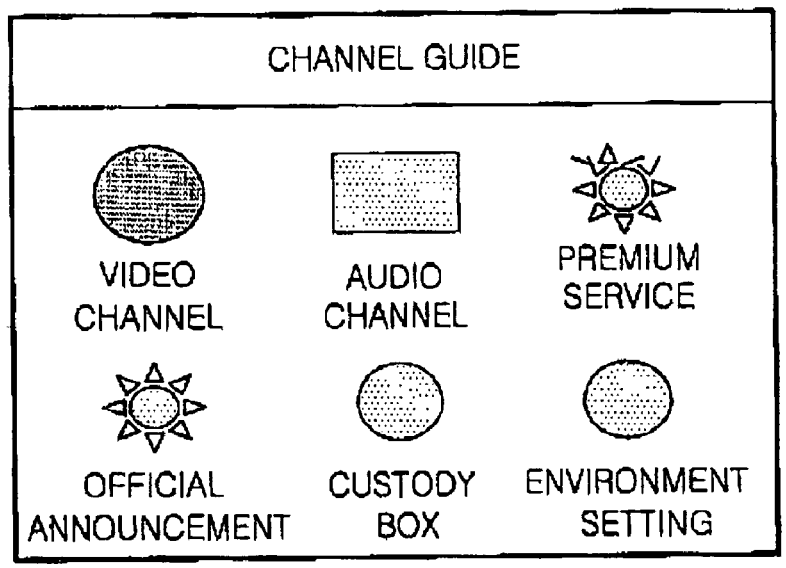
FIGS. 3A to 3D are exemplary views of broadcast programming information provided according to the prior art.
Figure 3B:
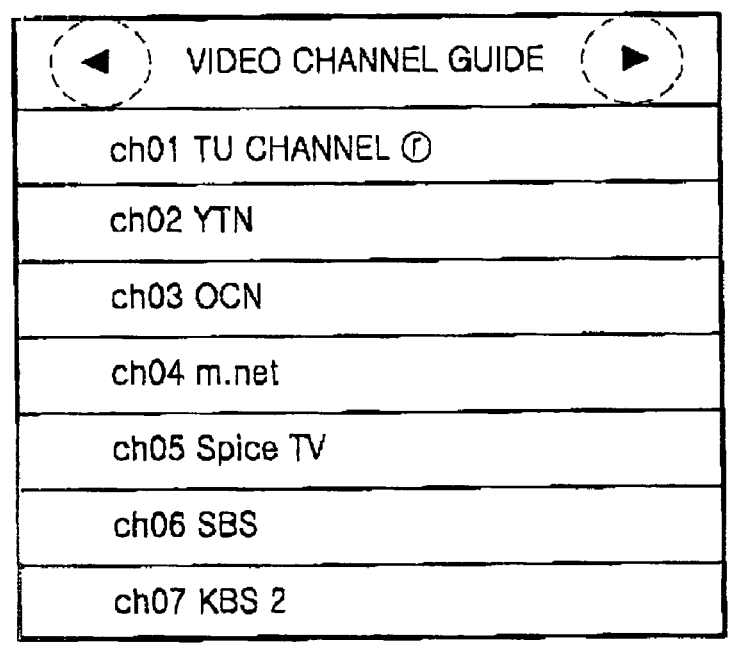
Figure 3C:
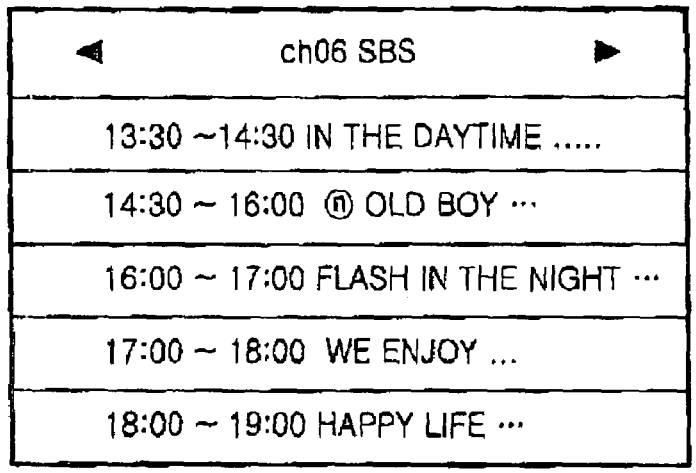
Figure 3D:
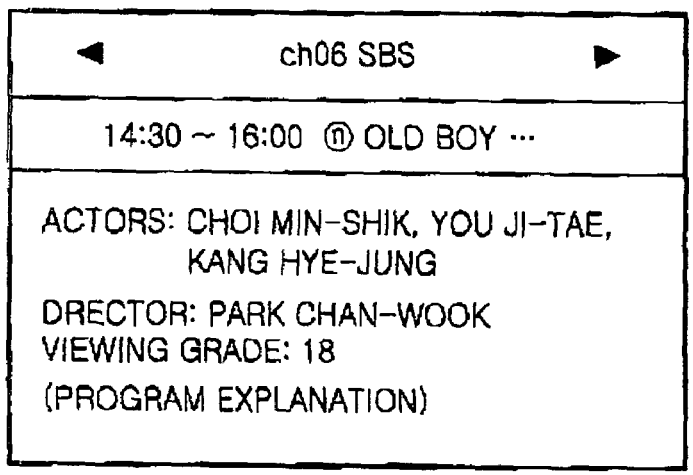

Preferred embodiments of the present invention will be described in detail hereinafter with reference to the accompanying drawings. In the following description of the present invention, the same drawing reference numerals are used for the same elements even in different drawings. Additionally, a detailed description of known functions and configurations incorporated herein will be omitted when it may obscure the subject matter of the present invention.

Figure 4:
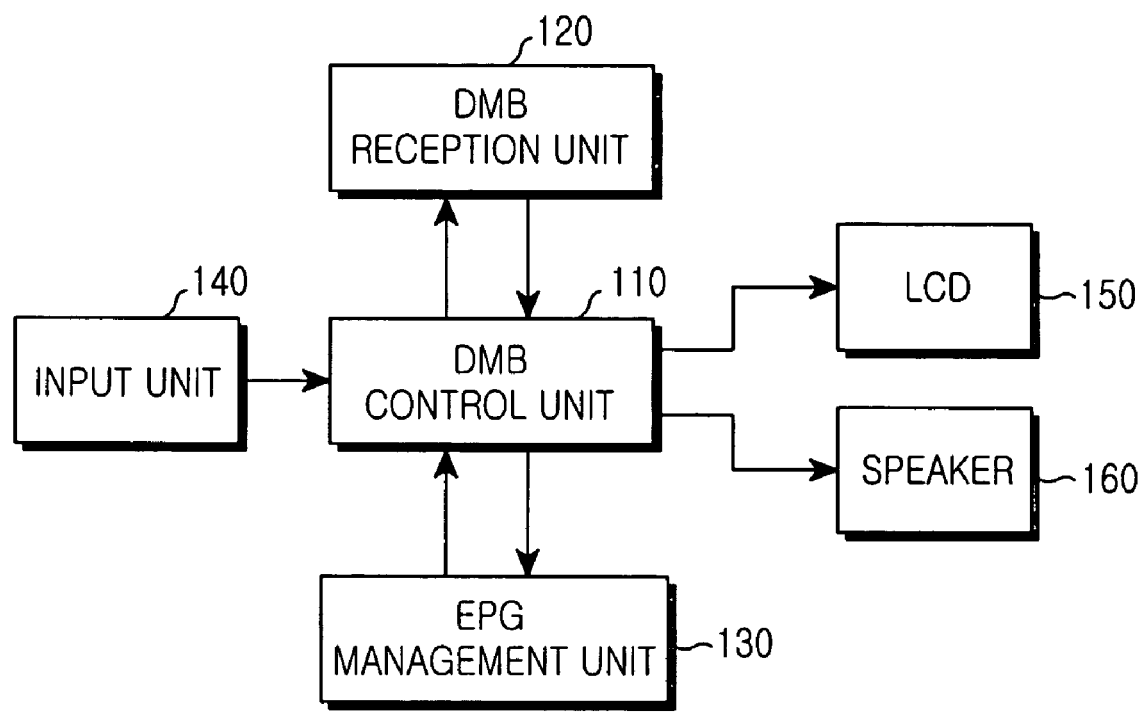
FIG. 4 is a block diagram of a digital broadcast receiving terminal according to an embodiment of the present invention.

FIG. 4 is a block diagram of a digital broadcast receiving terminal according to an embodiment of the present invention.

The digital broadcast receiving terminal 100 according to an embodiment of the present invention includes a DMB (Digital Multimedia Broadcasting) control unit 110, a DMB reception unit 120, an EPG (Electronic Program Guide) management unit 130, an input unit 140, a display unit 150 and a speaker 160.

The DMB control unit 110 controls the operation of the private terminal 100 for receiving digital broadcasts in accordance with commands input through the input unit 140 and pre-stored operation programs. The DMB reception unit 120 receives broadcasting data (hereinafter referred to as 'DMB data') and program guide data (hereinafter referred to as 'EPG data') under the control of the DMB control unit, and transfers them to the DMB control unit 110. The EPG management unit 130 stores/manages received EPG data under the control of the DMB control unit 110.

The input unit 140 receives and transfers the external command to the DMB control unit 110. If the digital broadcast receiving terminal 100 is a private terminal for receiving digital broadcasts, the input unit 140 may be implemented by a user interface means such as a keyppad through which a user directly inputs manipulation signals. If the digital broadcast receiving terminal 100 is multi-functional providing mobile communication and digital broadcast reception, the input unit 140 may be configured to receive input commands (for example, information request, channel change, etc.) or data (for example, time period in which information confirmation is requested) from a main control unit (not illustrated) that also controls the mobile communication function.

The display unit 150 and the speaker 160 visually and aurally output the digital broadcast programming guide information which may be generated using the received DMB data or the EPG data stored in the EPG management unit 130. The display unit 150 may be implemented by an LCD (Liquid Crystal Display).

In particular, if a request for digital broadcast program information in a specific time period is input from the user via input unit 140, the DMB control unit 110, in response to the request, detects program information by channels in the corresponding time period from the EPG data stored in the EPG management unit 130, and provides the program information to the user through the display unit 150 and/or the speaker 160. In this case, the specific time period may correspond to the present time or a specified time designated by the user. Additionally, it is preferable that in response to the request, the DMB control unit 110 updates the EPG data stored in the EPG management unit 130, and then detects the program information by channels in the corresponding time period based on the updated EPG data.

Figure 5:
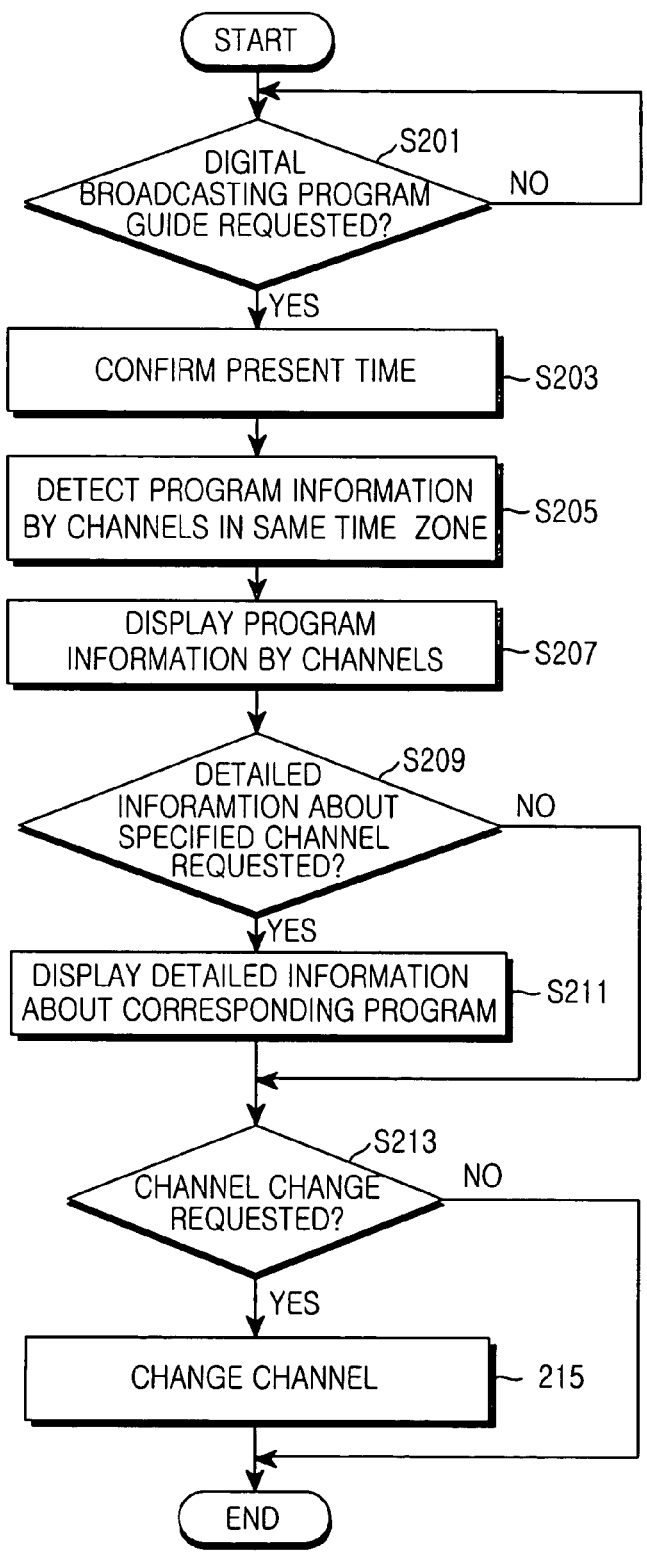
FIG. 5 is a flowchart illustrating a method for providing broadcast programming information in the same time period as a user according to an embodiment of the present invention.

FIG. 5 is a flowchart illustrating a method for guiding broadcasting program information in a same time period according to an embodiment of the present invention. In this embodiment, it is assumed that the user requests the broadcast programming information for the present time.

Figure 6A:
Figure 6B:

FIGS. 6A to 6C are exemplary views explaining the method of providing guidance of broadcast programming information for programs in the same time period according to an embodiment of the present invention.

Now, the method for guiding broadcast programmning information for content in the same time period according to the present invention will be explained in detail with reference to FIGS. 4 to 6C.

If a user requests guidance for digital broadcast programming in a specific period (for example, at the present time)

through the input unit 140, the DMB control unit 110 recognizes this (step S201) and confirms the present time (step S203). Then, the DMB control unit 110 detects the program information by channels in the corresponding time period from the EPG management unit 130 (step S205). For this, it is preferable that the DMB control unit 110 has specified information for determining the same time period.

For example, the specific, or same time period may be the present time or the time period including five minutes before and after the present time. The DMB control unit 110 detects the program information by channels in the same time period based on the specified information. It is also preferable to separately provide keys (for example, a 'menu key', etc.) for enabling the user to request the guidance of the digital broadcasting programs telecast through several channels at the same time.

If the detection of the program information by channels in the same time period is completed, the detected program information is displayed so that the user can see it (step S207). In this case, an OSD (On Screen Display) method may be used. In particular, the program information by channels may be displayed in one sliding line located on the lower part of a display screen. That is, the program information by channels is displayed in a manner that it scrolls in a line on a specified part of the screen so that the user can confirm the program information. FIG. 6A illustrates an example of a display state of the program information by channels. That is, in FIG. 6A, the information about programs (for example, "CH1 Daejanggum CH2 Want to marry . . . ") telecast through other channels at the present time is displayed in one sliding line located on the lower part of the display screen on which the digital broadcasting data is displayed.

In this case, it is preferable that the displayed program information is brief information about the programs by channels. For example, it is preferable that channel names and program names telecast through the corresponding channels are displayed in order. By displaying the program information by channels on the lower part of the screen as described above, the user can confirm the information about programs telecast through other channels at the present time without disturbing the viewing of the displayed broadcasting program.

If the user requests detailed information about a specified channel in a state that the program information by channels is displayed (step S209), the DMB control unit 110 displays the detailed information about the corresponding program (step S211). That is, if channel selection information (for example, special sign (*) and channel number (13), i.e., '*13') is input through the input unit 140, the DMB control unit 110 extracts the detailed information about the channel from the EPG management unit 130, and displays the detailed information through the display unit 150.

For example, The DMB control unit 110 extracts and displays the detailed information such as telecast start time, telecast end time, representative actor, director, viewing grade, etc., of the corresponding program. In this case, it is preferable that the detailed program information is displayed in the same manner as the program information by channels. FIGS. 6A and 6B illustrate an example of a display state of the detailed program information (for example, "CH1 14:30~16:00 Actors: Lee Young-Ae, Jee Jin-Hee") that is displayed in one sliding line located on the lower part of the display screen on which the digital broadcasting data is displayed. However, the display type of the detailed program information is not limited to that illustrated in FIG. 6B. It is also possible to display the detailed program information through a separate display window as illustrated in FIG. 6C.

If the user requests a channel change (for example, if the user presses a 'confirm' key) when the detailed program information of the selected channel is displayed (step S213), the present channel is changed to the selected channel (step S215). As described above, the user can easily confirm the information about programs telecast through other channels at the present time, and can easily change to a desired channel.

If the user requests again the program information by channels (for example, if the user presses a 'cancel' key) when the detailed program information of the selected channel is displayed, the DMB control unit 110 displays the program information by channels, which was displayed in the previous process (step S207). That is, it is preferable to display the program information by channels as described above so that the user can select the detailed program information of another channel after the user confirms that the selected channel is not the user's desired channel through the detailed program information being displayed.

In the embodiment of the present invention, to obtain the information about the programs telecast in the same time period, the broadcasting times should be compared. For this, in storing the EPG data, the time information is stored after it is converted into a specified form (for example, numerals) so that broadcasts in a specified time period can be searched using the time information.

For example, it is assumed that the start time of a certain broadcast is 17:00:00, Jun. 23, 2004 and its end time is 21:00:00, Jun. 23, 2004. In this case, the start time calculated as follows based on the year 2004 corresponds to 15,181,200 seconds.

(1) Year calculation: 2004−2004=0
(2) Day calculation: 0×365+(31+29+31 +30+31 +23)=175
   (Numerals in parentheses indicate the number of days for each month, and the year 2004 is a leap year.)
(3) Time calculation in terms of seconds: 175 days×24 hours×3600 seconds=15,120,000 17 hours×3600+0 minute×60 seconds+0 second=61,200

In the same manner, the calculated end time corresponds to 15,195,600 seconds.

In order to store the EPG data into which the start time and the end time as calculated above are inserted, a field of 4 bytes is required for each program. The terms of 15,181,200 seconds and 15,195,600 seconds are converted into HEX values of 0x00E7A590 and 0x00E7DDD0, respectively.

```
typedef struct{
    unsigned short   EvtID;
    unsigned char    StartTime[8];
    unsigned char    Duration[3];
    DWORD            TimeStart;
    DWORD            TimeFinish;
    unsigned char    FreeMode;
    unsigned char    EvtNameLen;
    unsigned char    EvtName[MAX_EVT_NAME];
    unsigned char    EvtNameExtLen;
    unsigned char    EvtNameExt[MAX_EVT_NAME_EXT];
} EPG_PGM_INFO;
```

The above-described program is prepared preferably using the C language.

If the user requests program information when the start time and end time of every program are calculated in terms of seconds and stored as described above, the present time is also calculated in terms of seconds, and compared with the value existing in the EPG data to bring the information of the program being currently telecast. For example, if the present time is 19:34:23, Jun. 23, 2004, it corresponds to 15,251,663 seconds, and its HEX value is 0xE8B8CF. Because this value is between the start time of 0x00E7A590 and the end time of 0x00E7DDD0, it may be judged that the corresponding program is being broadcast at the present time. So, the corresponding program information is displayed on the display screen.

In the foregoing description, it is assumed that the time in which programs, the information of which is requested by the user, are telecast is the present time. However, the program information guidance can be provided in any time desired by the user. That is, if the present time is 7:00:00 and the user wants the guidance of program information by channels to be telecast at 16:30:00, the user may input 16:30:00 as the user's desired time. In this case, the time data directly input by the user is sensed and calculated in terms of seconds instead of automatically confirming the present time at step S203 of FIG. 5, and then the programs to be broadcast in that time period are searched in the same manner as described above. For example, even if the sender side provides the information about a broadcasting schedule of today and tomorrow or for three days, the guidance of the program information can be provided for any time period of today and tomorrow or included in the three days. In other words, the program information guidance may be changed in accordance with the information providing policy of the program information provider.

Additionally, the reception of the EPG data may be performed when the user requests the guidance of the digital broadcasting programs or at predetermined intervals irrespective of the user's request, so that the EPG data is referred to whenever the user requests it. Here, the term "at predetermined intervals" may be, for example, four times a day if the program information provider provides version-changed information four times a day. If the version is not changed, the program information may be received once when the user starts the viewing of the digital broadcast. In other words, the reception of the EPG data may also be changed in accordance with the information providing policy of the program information provider.

As described above, according to the present invention, the user can easily search the information about programs being broadcast through other broadcasting channels while the user views a digital broadcast. Additionally, the user can easily perform a channel change to a desired channel in accordance with a result of search. This provides the user great convenience in using the digital broadcast receiving terminal.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A digital broadcast receiving terminal comprising:
   an input unit for receiving a user's input of a command or data for requesting information about broadcast programs by channels in the same time period;
   a reception unit for receiving digital broadcasting data and program guide data;
   a management unit for storing and managing the program guide data;
   a control unit for converting broadcasting time information of programs by channels into a specified form when storing the program guide data in the management unit, if a request for the broadcasting program information by channels in a specified time period through the input unit is sensed, detecting the corresponding program guide data by comparing a value obtained by converting the specified time period into the specified form with values obtained by converting the time information of the programs by channels into the specified form, and creating the broadcasting program information by channels from the detected program guide data by channels to output the broadcasting program information; and
   an output unit for output of the digital broadcasting data or the broadcasting program information.

2. The digital broadcast receiving terminal as claimed in claim 1, wherein the value converted into the specified form is in terms of seconds.

3. The digital broadcast receiving terminal as claimed in claim 1, wherein the control unit updates the digital broadcasting program guide data stored in the management unit when the request is received or a predetermined time elapses.

4. The digital broadcast receiving terminal as claimed in claim 1, wherein time period is a time when the request is input or is a time period that includes a predetermined time range before and after the time.

5. The digital broadcast receiving terminal as claimed in claim 1, wherein the time period is a time designated by the user or is a time period that includes a predetermined time range before and after the designated time.

6. The digital broadcast receiving terminal as claimed in claim 1, wherein the control unit creates the broadcasting program information by channels that includes a channel name and a program name from the detected program guide data by channels.

7. The digital broadcast receiving terminal as claimed in claim 1, wherein if a channel is selected when the broadcasting program information by channels is output, the control unit controls the output of detailed information about the selected channel from the detected program guide data by channels.

8. The digital broadcast receiving terminal as claimed in claim 7, wherein if a user's channel change request is input when the detailed information about the selected channel is output, the control unit changes the channel in response to the request.

9. The digital broadcast receiving terminal as claimed in claim 1, wherein the output unit displays the program guide data by channels by on-screen display on a specified position of a display screen of the output unit under the control of the control unit.

10. The digital broadcast receiving terminal as claimed in claim 9, wherein the output unit displays the program guide data by channels in one sliding line located on a lower part of the screen of the output unit.

11. The digital broadcast receiving terminal as claimed in claim 1, wherein the output unit displays the program guide data by channels in one sliding line located on a lower part of the screen of the output unit.

12. The digital broadcast receiving terminal as claimed in claim 1, wherein the control unit converts start time and end time information of the programs by channels into the specified form to store the information in the management unit, and if a time period in which the user wants to receive the information is sensed, it converts the time period into the specified form, compares the converted time period with the start time and end time information converted into the specified form, and creates the program information based on the corresponding program guide data if the converted time period belongs to a range of the start time and end time as a result of comparison to display the created program information through the output unit.

13. A method for guiding broadcasting program information for a digital broadcast receiving terminal, comprising:
  converting a specified time period into a specified form if a user's request for broadcasting program information by channels in the specified time period is sensed;
  detecting program guide data by channels in the specified time period by comparing a value obtained by converting the specified time period into the specified form with values obtained by converting broadcasting time information of programs by channels of the program guide data into the specified form;
  creating the broadcasting program information by channels from the program guide data by channels; and
  outputting the created broadcasting program information by channels to provide the broadcasting program information to the user.

14. The method as claimed in claim 13, further comprising, if one channel is selected from the broadcasting program information, reading detailed information about the selected channel from the detected program guide data by channels, and outputting the detailed information.

15. The method as claimed in claim 14, further comprising, if a user's channel change request is input in a state that the detailed information about the selected channel is output, changing the channel in response to the request.

16. The method as claimed in claim 14, displaying the detailed information about the selected channel by on-screen display on a specified position of a digital broadcasting data output screen.

17. The method as claimed in claim 14, further comprising displaying the detailed information about the selected channel in one sliding line located on a lower part of the digital broadcasting data output screen.

18. The method as claimed in claim 16, further comprising displaying the detailed information about the selected channel in one sliding line located on a lower part of the digital broadcasting data output screen.

19. The method as claimed in claim 13, wherein the detection step updates the pre-stored program guide data before detecting the program guide data by channels.

20. The method as claimed in claim 19, further comprising, if a predetermined time period elapses, receiving the program guide data, and converting the broadcasting time information of the programs by channels into the specified form to store the converted broadcasting time information.

21. The method as claimed in claim 19, further comprising receiving the program guide data in response of the request, and converting the broadcasting time information of the programs by channels into the specified form to store the converted broadcasting time information.

22. The method as claimed in claim 13, wherein the detection step determines a time when the request is input or a time period that includes a predetermined time range before and after the time as the time period before detecting the program guide data by channels.

23. The method as claimed in claim 13, wherein the detection step receives a reference time for determining the time period before detecting the program guide data by channels and determines a time period that includes a predetermined time range before and after the reference time as the time period.

24. The method as claimed in claim 13, wherein the broadcasting program information by channels created at the creation step includes a channel name and a program name.

25. The method as claimed in claim 13, wherein the output step displays the broadcasting program information by channels in one sliding line located on a lower part of a digital broadcasting data output screen.

26. The method as claimed in claim 13, wherein the specified time period is the present time, and the present time is automatically confirmed in response to the user's request for the broadcasting program information by channels.

* * * * *